US007413117B2

(12) United States Patent
Caven et al.

(10) Patent No.: US 7,413,117 B2
(45) Date of Patent: Aug. 19, 2008

(54) PRE-PAID ACTIVATION AND REPLENISHMENT ON A POINT-OF-SALE DEVICE

(75) Inventors: Howard Caven, Pearland, TX (US); Matthew Peterson, Houston, TX (US); Diane Blankstrom, Katy, TX (US); David W. Smith, Sugar Land, TX (US)

(73) Assignee: First Data Corporation, Englewood, CO (US)

( * ) Notice: Subject to any disclaimer, the term of this patent is extended or adjusted under 35 U.S.C. 154(b) by 233 days.

(21) Appl. No.: 11/054,348

(22) Filed: Feb. 9, 2005

(65) Prior Publication Data

US 2006/0175394 A1 Aug. 10, 2006

(51) Int. Cl.
*G06Q 40/00* (2006.01)
*G07D 11/00* (2006.01)
*G07F 19/00* (2006.01)

(52) U.S. Cl. ........................ 235/379; 235/375

(58) Field of Classification Search ................. 235/375, 235/379; 705/17
See application file for complete search history.

(56) References Cited

U.S. PATENT DOCUMENTS

| | | | |
|---|---|---|---|
| 4,562,340 A | 12/1985 | Tateisi et al. | |
| 4,678,895 A | 7/1987 | Tateisi et al. | |
| 4,890,317 A | 12/1989 | Hird et al. | |
| 5,175,682 A | 12/1992 | Higashiyama et al. | |
| 5,237,159 A | 8/1993 | Stephens et al. | |
| 5,444,616 A | 8/1995 | Nair et al. | |
| 5,679,938 A | 10/1997 | Templeton et al. | |
| 5,679,940 A | 10/1997 | Templeton et al. | |
| 5,691,524 A | 11/1997 | Josephson | |
| 5,696,739 A | 12/1997 | Chang | |
| 5,703,344 A | 12/1997 | Bezy et al. | |
| 5,796,832 A * | 8/1998 | Kawan ........................ 705/65 |
| 5,801,366 A | 9/1998 | Funk et al. | |
| 5,811,771 A | 9/1998 | Dethloff | |
| 5,848,400 A | 12/1998 | Chang | |
| 5,848,412 A | 12/1998 | Rowland et al. | |
| 5,901,214 A | 5/1999 | Shaffer et al. | |
| 5,930,777 A | 7/1999 | Barber | |
| 5,991,749 A | 11/1999 | Morrill, Jr. | |
| 5,991,758 A | 11/1999 | Ellard | |
| 6,059,185 A | 5/2000 | Funk et al. | |
| 6,097,834 A | 8/2000 | Krouse et al. | |
| 6,098,052 A | 8/2000 | Kosiba et al. | |

(Continued)

OTHER PUBLICATIONS

Search report for PCT/US06/04529, mailed Jan. 17, 2007.*

*Primary Examiner*—Lisa M Caputo
(74) *Attorney, Agent, or Firm*—Sutherland Asbill & Brennan LLP

(57) ABSTRACT

A system and method for processing prepaid financial transactions. One or more remote terminals are adapted to acquire transaction information from a user and transmit a first signal indicative of the transaction information. The remote terminal is further adapted to receive a second signal indicative of authorizing information that is delivered to the user. In addition, an authorizing host is adapted to receive the first signal transmitted by the one or more remote terminals. In one aspect, the authorizing host routes the first signal including the transaction information to an exchange host for approval of the financial transaction, and the exchange host transmits the second signal including the authorizing information to the remote terminal via the authorizing host.

41 Claims, 6 Drawing Sheets

U.S. PATENT DOCUMENTS

| | | |
|---|---|---|
| 6,098,054 A | 8/2000 | McCollom et al. |
| 6,117,011 A | 9/2000 | Lvov |
| 6,129,274 A | 10/2000 | Suzuki |
| 6,189,785 B1 | 2/2001 | Lowery |
| 6,196,460 B1 | 3/2001 | Shin |
| 6,202,005 B1 | 3/2001 | Mahaffey |
| 6,224,109 B1 | 5/2001 | Yang |
| 6,230,145 B1 | 5/2001 | Verderamo et al. |
| 6,230,148 B1 | 5/2001 | Pare, Jr. et al. |
| 6,257,487 B1 | 7/2001 | Hayashida |
| 6,305,603 B1 | 10/2001 | Grunbok et al. |
| 6,378,775 B2 | 4/2002 | Hayashida |
| 6,381,324 B1 | 4/2002 | Shaffer et al. |
| 6,505,772 B1 | 1/2003 | Mollett et al. |
| 6,507,851 B1 | 1/2003 | Fujiwara et al. |
| 6,522,772 B1 | 2/2003 | Morrison et al. |
| 6,529,725 B1 | 3/2003 | Joao et al. |
| 6,547,132 B1 | 4/2003 | Templeton et al. |
| 6,581,043 B1 | 6/2003 | Wallin et al. |
| 6,594,641 B1 | 7/2003 | Southam |
| 6,597,636 B1 | 7/2003 | Marchello |
| 6,609,905 B2 | 8/2003 | Eroglu et al. |
| 2002/0052852 A1 | 5/2002 | Bozeman |
| 2002/0060242 A1 | 5/2002 | Hayashida |
| 2002/0178112 A1 | 11/2002 | Goeller et al. |
| 2003/0093368 A1 | 5/2003 | Manfre et al. |
| 2003/0132293 A1 | 7/2003 | Fitch et al. |
| 2003/0132294 A1 | 7/2003 | Gomez et al. |
| 2003/0132297 A1 | 7/2003 | McCall et al. |

* cited by examiner

PRE-PAID ACTIVATION AND REPLENISHMENT ON A POINT-OF-SALE DEVICE

BACKGROUND

1. Field

The present teachings relate to financial transactions and, in particular, to a system and method pertaining to prepaid activation and replenishment with a point-of-sale device.

2. Description of the Related Art

In general, prepaid products and services, such as prepaid calling cards, prepaid cellular phone service, prepaid movie rentals, etc., are popular. Many retail locations offer these prepaid products and services for sale. Unfortunately, common prepaid products and services are inconvenient for merchants to process due to worker inefficiency. For example, a customer requests prepaid service, such as a purchasing pre-paid long distance minutes, by taking a calling card to the merchant counter so that the worker can activate the minutes on the calling card. The merchant is then required to call the service provider and activate the minutes, which can tie up the phone system and take an undesirably long time. Typically, the minutes on the calling card cannot be activated until an authorization code, such as a PIN number, is given to the worker over the phone and, subsequently, given to the customer. This process can be inconvenient for the merchant due to the amount of time the worker has to spend on phone with the service provider while waiting for authorization. Also, this may cause some stress for the merchant and worker because there may be other customers in line impatiently waiting for their turn.

While more efficient systems exist for processing transactions, such as risk analysis and assessment, many of these systems do not have the capability to handle prepaid services as prepaid services may have a many different vendors or service providers for each product or service. One example of a transaction processing system includes an automated check acceptance service, such as Telecheck, that uses an existing communication network for electronic check verification and acceptance. Typically, these check acceptance services use a dedicated communications network that automatically transmits information about the promissory payment to a central approval agency which then automatically processes the transaction. Subsequently, the vendor receives an indication whether the transaction is to be accepted or declined. As such, the check acceptance services does not impose a substantial burden on the worker in the store as it is a largely automated process that utilizes a separate communications network.

Unfortunately, the use of a dedicated automated network is generally not financially viable for pre-paid goods and services. Specifically, it is possible that the store front will have to have a separate network connection for each prepaid good or service being sold. This could include a separate network for each identical goods and services provided by competing suppliers. Further, the cost of developing the network for the pre-paid services is generally an expense that pre-paid services have been unwilling to undertake.

Hence, there is a need for a more efficient way of activating prepaid goods and services. To this end, there is a need for an automated authorization service that can be used with a variety of different pre-paid goods and service providers which does not require separate networks for each goods and services provider.

SUMMARY

The aforementioned needs are satisfied in one aspect, by a check acceptance network that has been modified to accept transactions relating to prepaid goods and services. Check acceptance agencies includes point of sale devices located in a plurality of store locations that can transmit data to a risk approval agency which evaluates the risk of accepting a proffered promissory payment. In one implementation, the point of sale device has been modified to permit the transmission of data to the risk assessment agency relating to a request to purchase a prepaid good or service.

In one implementation, the risk assessment agency recognizes the request for a prepaid good or service transaction and forwards the request to the appropriate prepaid good or service provider. In this implementation the risk assessment agency is further adapted to receive authorization codes from the prepaid good or service provider and provide these codes back to the originating point of sale device in the store. In this way, an existing distributed network can be used to authorize point of sale devices without requiring an individual at the store to contact the pre-paid good and service provider directly.

One aspect of the present teachings relates to a system for assessing the risk associated with a proffered promissory payment. The system is linked to at least one prepaid goods or service provider. The system includes a plurality of point of sale devices located within a plurality of distributed locations. The plurality of point of sale devices acquire information about proffered promissory payments and also acquire information about requests for prepaid goods or services. The plurality of point of sale devices include a communications interface for communicating information to individuals within the plurality of distributed locations. The system further includes an authorizing host that is communicatively linked to the plurality of point of sale devices. The authorizing host receives the information about the proffered promissory payments and assesses the risk of accepting the proffered promissory payment. The authorizing host communicates acceptance or decline information to the point of sale device corresponding to a particular proffered promissory payment. The authorizing host is adapted to route a request for a prepaid good or service to the corresponding goods or services provider and then transmit acceptance or decline information to the point of sale device originating the request for prepaid good or service.

In one embodiment, the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

In one embodiment, the plurality of transaction devices include an input for inputting information. The communications interface includes a display screen that displays the acceptance and decline information.

In one embodiment, the plurality of transaction devices allow the merchant to transmit requests for prepaid goods or services for a plurality of different prepaid goods and service providers and receive acceptance and decline information from the plurality of different prepaid goods and service providers via the authorizing host. In one embodiment, the plurality of different prepaid goods and service providers include cellular telephone providers, long distance telephone providers, video rental providers. In one embodiment, the authorizing host and the plurality of transaction devices are configured to provide an authorizing code to the purchaser of the prepaid goods and services in response to the prepaid good and service provider approving the request for prepaid goods and services. In one embodiment, the authorizing code includes a PIN number that the purchaser utilizes to activate the prepaid good or service.

Another aspect of the present teachings relates to a point of sale device adapted to be positioned within a store for transmitting financial information about proffered promissory payments to a central authorizing agency. The point of sale device is further adapted to receive requests for prepaid goods and services and transmit those requests to the central authorizing agency for subsequent retransmission to the prepaid goods and service provider. The point of sale device is further adapted to provide approval or decline information about the proffered promissory payments and the prepaid goods and service requests to individuals.

In one embodiment, the point of sale device includes one or more user inputs for inputting information about the proffered promissory payment and the requests for prepaid goods and services into the point of sale device. In one embodiment, the one or more user inputs includes a scanner for scanning magnetic information off of checks. In one embodiment, the one or more user inputs includes a keypad for entering data relating to the request for prepaid goods and services.

In one embodiment, the point of sale device includes a display for displaying an authorization code to the purchaser of the pre-paid goods and services. In one embodiment, the authorization code includes a PIN number suitable for activating additional minutes on a cellular telephone account.

Yet another aspect of the present teachings relates to a system for processing requests for prepaid goods and service. The system includes a risk assessment system having a plurality of distributed transaction devices located at a plurality of different locations and an authorizing host that receives information about proffered promissory payments from the plurality of distributed transaction devices. The authorizing host performs a risk assessment on the proffered promissory payments and sends approval or decline signals to the distributed transaction device where the proffered promissory payment originated. The risk assessment system is configured to allow individuals to send requests for prepaid goods and services via the risk assessment system to prepaid good and services vendors independent of the risk assessment system and receive approval information from the goods and service vendors via the risk assessment system.

In one embodiment, the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

In one embodiment, the plurality of transaction devices include an input for inputting information. The communications interface includes a display screen that displays the acceptance and decline information.

In one embodiment, the plurality of transaction devices allow the merchant to transmit requests for prepaid goods or services for a plurality of different prepaid goods and service providers and receive acceptance and decline information from the plurality of different prepaid goods and service providers via the authorizing host. In one embodiment, the plurality of different prepaid goods and service providers include cellular telephone providers, long distance telephone providers, video rental providers. In one embodiment, the authorizing host and the plurality of transaction devices are configured to provide an authorizing code to the purchaser of the prepaid goods and services in response to the prepaid good and service provider approving the request for prepaid goods and services. In one embodiment, the authorizing code includes a PIN number that the purchaser utilizes to activate the prepaid good or service.

Yet another aspect of the present teachings relates to a method of processing financial transactions. The method includes transmitting data about a proffered promissory payment offered at a remote location to a central authorization host. The method further includes performing risk assessment on the proffered promissory payment. The method further includes transmitting an acceptance or decline of the proffered promissory payment from the central authorization host to the remote location. The method further includes transmitting data about a request for a prepaid good and service from the remote location to a prepaid goods and service provider via the central authorization host. The method further includes providing authorization information to the remote location from the prepaid good and service provider via the central host.

In one embodiment, transmitting data about a proffered promissory payment offered at a remote location to a central authorization host includes sending data about a check written to a merchant to the central authorization host. In one embodiment, performing risk assessment on the proffered promissory payment includes evaluating the history of the person writing the check, the amount of the check, the type of transaction and characteristics of the merchant to determine whether to accept or decline the check.

In one embodiment, transmitting data about a request for a prepaid good and service from the remote location to a prepaid good and service provider via the central authorization host includes sending an electronic signal having the request to the central authorization host identifying a particular good and service provider, and routing the electronic signal having the request from the central host to the particular good and service provider. In one embodiment, providing authorization information to the remote location from the prepaid good and service provider via the central host includes transmitting a PIN number from the prepaid good and service provider to the remote location via the central authorizing host.

Yet another aspect of the present teachings relates to a system for processing financial transactions. The system includes means for transmitting information including financial data and requests for prepaid goods and services to and from a plurality of remote locations. The system further includes means for evaluating financial data from the means for transmitting information to ascertain the risk of accepting proffered promissory payments. The means for evaluating financial data includes means for retransmitting requests for prepaid goods and services to an external goods and service provider and means for transmitting authorization information from the external goods and service provider to the means for transmitting financial data and requests for prepaid services.

In one embodiment, the means for transmitting information including financial data and requests for prepaid good and services includes a plurality of point of sale devices located within a plurality of distributed locations. The plurality of point of sale devices acquire information about proffered promissory payments and also acquire information about requests for prepaid goods or services. The plurality of point of sale device include a communications interface for communicating information to individuals within the plurality of distributed locations.

In one embodiment, the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

In one embodiment, the plurality of transaction devices include an input for inputting information. The communications interface includes a display screen that displays the acceptance and decline information.

In one embodiment, the plurality of transaction device allows the merchant to transmit requests for prepaid goods or services for a plurality of different prepaid goods and service providers and receive acceptance and decline information from the plurality of different prepaid goods and service providers via the authorizing host.

In one embodiment, the means for evaluating financial data from the means for transmitting information to assess the risk of accepting proffered promissory payment includes an authorizing host that is communicatively linked to the plurality of point of sale devices. The authorizing host receives the information about the proffered promissory payments and assesses the risk of accepting the proffered promissory payment. The authorizing host communicates acceptance or decline information to the point of sale device corresponding to a particular proffered promissory payment. The authorizing host is adapted to route a request for a prepaid good or service to the corresponding goods or services provider and then transmit acceptance or decline information to the point of sale device originating the request for prepaid good or service. In one embodiment, the authorizing host and the plurality of transaction devices are configured to provide an authorizing code to the purchaser of the prepaid goods and services in response to the prepaid good and service provider approving the request for prepaid goods and services. In one embodiment, the authorizing code includes a PIN number that the purchaser utilizes to activate the prepaid good or service.

Yet another aspect of the present teachings relates to a system for assessing the risk associated with a proffered promissory payment, where the system is linked to at least one prepaid goods or service provider. The system includes a plurality of point of sale devices located within a plurality of distributed locations. The plurality of point of sale devices acquire information about a first type of financial transaction and also acquire information about a second type of financial information. The plurality of point of sale devices include a communications interface for communicating information to individuals within the plurality of distributed locations. The system further includes an authorizing host that is communicatively linked to the plurality of point of sale devices. The authorizing host receives the information about the first type of financial transaction assesses the risk of associated with the first type of financial transaction. The authorizing host communicates acceptance or decline information to the point of sale device corresponding to first type of financial transaction. The authorizing host is adapted to route information about the second type of financial information to a corresponding external provider and then transmit acceptance or decline information to the point of sale device originating the second financial transaction.

In one embodiment, the first type of financial transaction includes a proffered promissory payment. The second type of financial transaction includes a request for prepaid goods or services.

In one embodiment, the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

In one embodiment, the plurality of transaction devices include an input for inputting information. The communications interface includes a display screen that displays the acceptance and decline information.

In on embodiment, the plurality of transaction devices allow the merchant to transmit requests for prepaid goods or services for a plurality of different prepaid goods and service providers and receive acceptance and decline information from the plurality of different prepaid goods and service providers via the authorizing host. In one embodiment, the plurality of different prepaid goods and service providers include cellular telephone providers, long distance telephone providers, video rental providers. In one embodiment, the authorizing host and the plurality of transaction devices are configured to provide an authorizing code to the purchaser of the prepaid goods and services in response to the prepaid good and service provider approving the request for prepaid goods and services. In one embodiment, the authorizing code includes a PIN number that the purchaser utilizes to activate the prepaid good or service.

These and other objects and advantages of the present teachings will become apparent from the following description taken in conjunction with the accompanying drawings.

DETAILED DESCRIPTION OF SOME EMBODIMENTS

Reference will now be made to the drawings wherein like numerals refer to like parts throughout. FIGS. 1-5B illustrate various aspects related to a system and method pertaining to prepaid activation and replenishment with a point-of-sale (POS) device.

Figure 1:
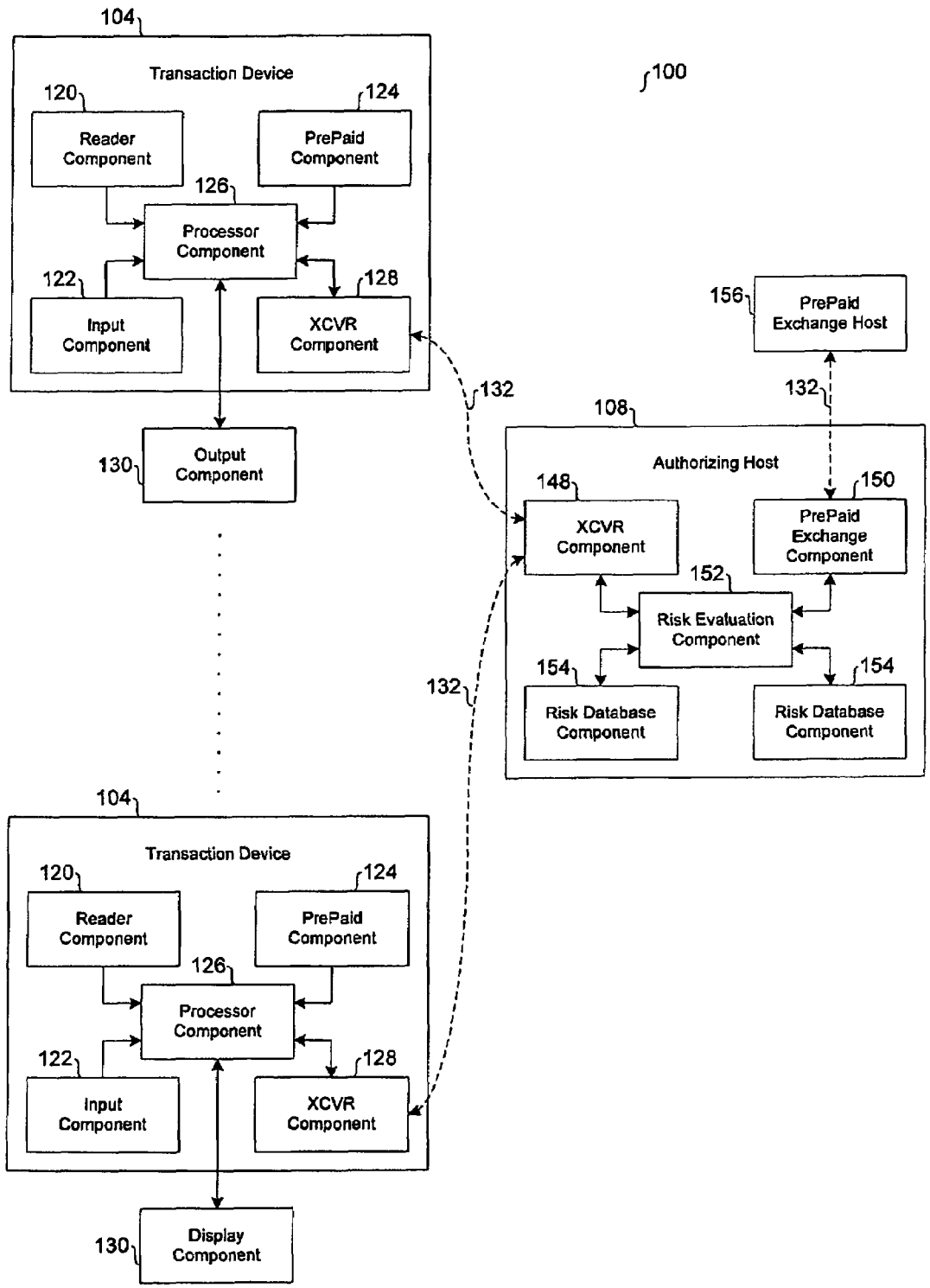
FIG. 1 illustrates one embodiment of a system for processing financial transactions.

FIG. 1 illustrates one embodiment of a system 100 for processing financial transactions. As illustrated in FIG. 1, the system 100 comprises one or more transaction devices 104, such as remote terminals or point of sale (POS) devices, and at least one authorizing host 108, such as a payment approval or risk assessment agency. The one or more transaction devices 104 and the authorizing host 108 communicate in a manner so as to process financial transactions and manage the risk or level thereof associated with financial transactions. In addition, the system 100 including the one or more transaction devices 104 and the authorizing host 108 is adapted to communicate with one or more prepaid exchange hosts 156 so as to process financial transactions involving prepaid goods and services, such as prepaid wireless or cellular phone services, prepaid long distance calling card services, etc.

In one embodiment, the prepaid exchange host 156 comprises a prepaid service provider that offers prepaid products and services for purchase, and requests for these prepaid products and services can be routed to the prepaid exchange host 156 via the one or more transaction devices 104 and the authorizing host 108. Additionally, the one or more transaction devices 104, the authorizing host 108, and the prepaid exchange host 156 communicate, for example, via a transaction network 132 comprising, for example, the transceiver components 128, 154 or various other communication links, such as a backbone network, a telephone network, an Intranet, the Internet, a modem, a wireless satellite link, etc. It should be appreciated that further scope and functionality related to processing and routing prepaid service requests will be described in greater detail herein below.

In one embodiment, the transaction device 104 comprises a plurality of functional components including a reader component 120, an input component 122, a prepaid component 124, a processor component 126, a transceiver component 128, and an output component 130. Additionally, the transaction device 104 is utilized by a merchant to accept promissory payments from customers. In one aspect, the transaction device 104 comprises a remote terminal or POS device, such as an Eclipse™ device that is described in greater detail herein below and illustrated in FIG. 2. However, it should be appreciated by those skilled in the art that the transaction device 104 may also include various types of payment devices including a cash register, personal computer, etc. without departing from the scope of the present teachings. Therefore, it should also be appreciated by those skilled in the art that one or more of the components as described herein may be integrated into the various types of payment devices without departing from the scope of the present teachings.

In one embodiment, the reader and input components 120, 122 may include various types of monetary exchange devices, such as check readers, credit card readers, debit card readers, keyboards for manual input of account information, or some combination thereof for the purpose of acquiring transaction information from customers or merchants at the point of sale. Also, the reader and input components 120, 122 of the transaction device 104 identifies, by either magnetic ink character recognition (MICR) or optical character recognition (OCR), the American Banking Association (ABA) account information printed on the face of the check draft and converts the customer's ABA account information to transaction information, which may include digital signals or digital signatures. The transaction information may then be transferred from the transaction device 104 to the authorizing host 108 for processing.

In one embodiment, the transaction device 104 such as the check reader reads the entire MICR line (that includes routing, account, and check number information) and sends data associated with the MICR to the authorizing host 108 for processing. Such MICR data can be formatted in any number of ways. In one embodiment, the check reader attaches identifying markers to different portions of the MICR data, and sends the resulting raw MICR data to the host 108. For example, one way to mark the MICR data is to represent the raw data string of the MICR by a "T," the on-us sign by an "O," the amount signs by an "A," and the dash by a "D." Such a format of raw MICR data is sometimes referred to as a raw TOAD data. In one embodiment, the host 108 receives the TOAD data and parses it to obtain the various information contained therein.

In one embodiment, the point of sale device 104 is capable of providing information about a proffered promissory payment, such as a check, to the authorizing host 108. The information includes identification information about the individual proffering the promissory payment, including the account information, the amount of the transaction and information identifying the merchant. The authorizing host 108 can then use this information to assess the risk of accepting the proffered promissory payment in a known manner and then provide back to the point of sale device 104 an acceptance or decline of the transaction. The manner in which the risk assessment is performed can include any of a number of known risk assessment strategies.

In one embodiment, the point of sale device 104 simply transmits information about the point of sale transaction to the host 108. The host 108 or some component of the host 108 (for example, a gateway to the host) is configured to distinguish the point of sale transaction as a sale transaction or a prepay transaction. The host 108 can then process the transaction accordingly. For example, the host 108 may request additional validation via the point of sale device 104. The host 108 then processes the transaction and returns a response to the point of sale device 104. In one embodiment, parameters that drive the prepay prompting products are stored in and driven by a database that the host maintains for the merchants.

Figure 2:
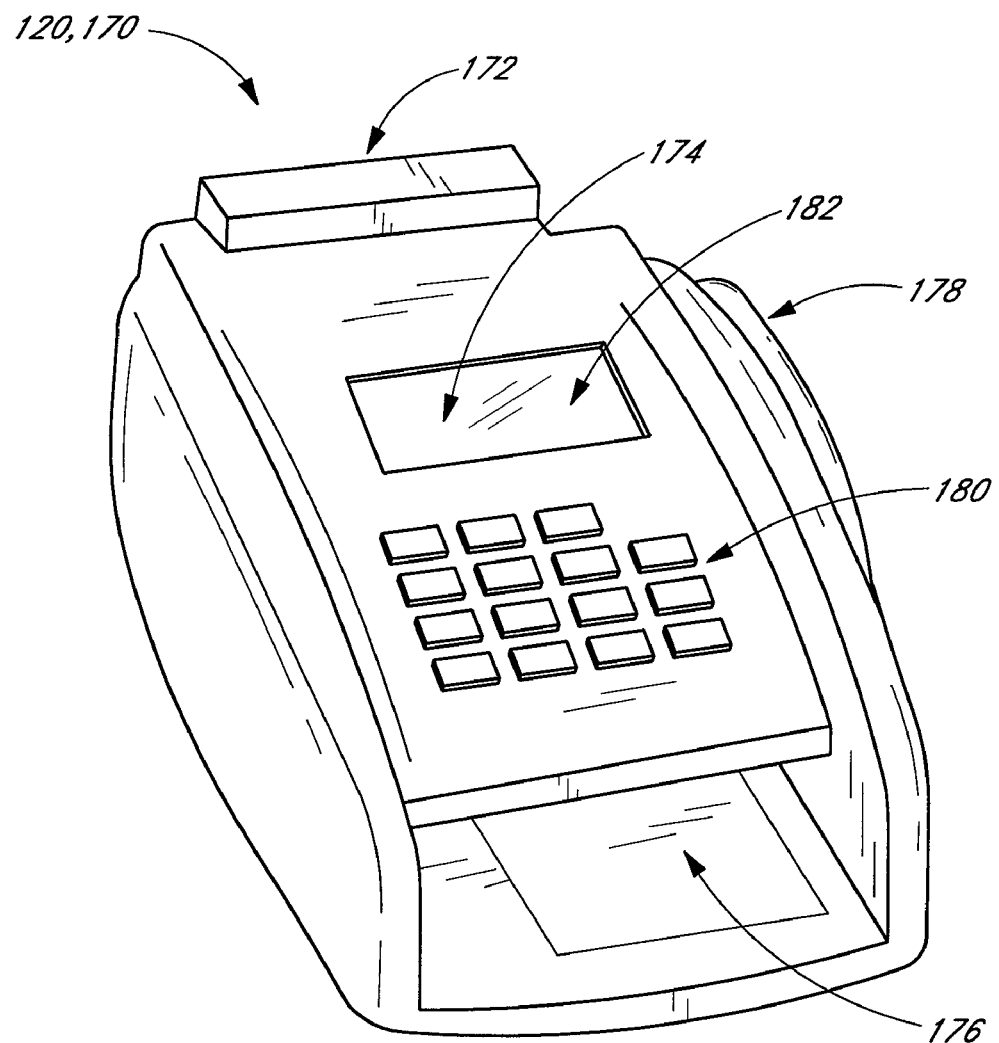
FIG. 2 illustrates one embodiment of the transaction device.

As is illustrated in FIG. 2, the authorizing host 108 includes a risk evaluation component 152 that evaluates risk of accepting the proffered promissory payments provided by the remote transaction devices 104. The risk evaluation component 152 can include a risk scoring engine or other risk determining mechanism that can access separate risk database components 154 in a known manner so as to be able to determine the risk of accepting the promissory payment. This allows the authorizing host 108 to accept or decline the promissory payment and transmit the appropriate information to the corresponding transaction device 104.

As will be described in greater detail below, the prepaid component 124 also acquires transaction and/or financial information related to prepaid goods and services, prepaid service requests, and prepaid transaction information, such as prepaid cellular or wireless phone minutes, calling card minutes, long distance calling card minutes, and movie rentals including video and DVD rentals. In one example, the prepaid component 124 may acquire prepaid information from the customer via input from the merchant. The merchant may push a button on the transaction device 104 or select a displayed menu item via keyboard entry. Subsequently, the merchant may input a monetary amount and some form of customer identity, such as the cell phone number, account number, calling card serial number, etc., so as to link the customer, the merchant, the transaction device 104, and the prepaid exchange host 156 to the prepaid service request. This allows the authorizing host 108 to identify the type of transaction for proper processing and routing. In one aspect, the transaction information is transmitted from the transaction device 104 to the authorizing host 108 in a data packet with a header or signature that identifies the prepaid transaction type including other needed information for processing and routing of the prepaid service request, which will be described in greater detail herein below.

Additionally, the prepaid component 124 may further comprise a database that stores prepaid transaction information including merchant information and prepaid exchange host information related to the merchant's and prepaid exchange host's product offerings including the above described prepaid services. Advantageously, the transaction device 104 is adapted to access prepaid transaction information stored in the prepaid component 124 to verify the prepaid exchange host's product offerings.

In one embodiment, the transceiver component 128 of the transaction device 104 is adapted to transmit data and information including a transaction data package from the transaction device 104 to the authorizing host 108. The transaction data package may include financial information about the customer and merchant and may include either prepaid transaction information about prepaid services and prepaid service requests or transaction information about a proffered promissory payment for risk assessment. In addition, the transceiver component 128 is also adapted to receive data and information including approval and/or decline data from the authorizing host 108. The transceiver component 128 may also be adapted to receive data and information related to prepaid services and offerings from the prepaid exchange host 156. The output component 130 may include a display monitor, a printer, or various other output peripherals generally known in the art. The display monitor may comprise a video monitor, a liquid crystal display (LCD), or any other relevant type of display. In one aspect, the prepaid exchange host's product offerings may be retrieved from the prepaid component 124 and displayed on the output component 130, such as the display monitor, for viewing thereof by a user, such as the merchant and customer.

In one embodiment, the processor component 126 of the transaction device 104 is adapted to coordinate the functions of the transaction device 104. The processor component 126 communicates with the reader and input components 120, 122 so as to receive transaction information therefrom. In addition, the processor component 126 communicates with the prepaid component 124 so as to retrieve the prepaid transaction information therefrom. The processor component 126 also combines or packages risk assessment transaction information on the prepaid transaction information, including financial information about the customer and merchant into a recognizable transaction data package. The processor component 126 further communicates with the transceiver component 128 so as to coordinate the transmission of the transaction data package to the authorizing host 108 and also to receive validation information from the authorizing host 108. Moreover, the processor component 126 communicates with the display component to inform the user of the current status of financial transactions.

In one embodiment, the authorizing host 108 comprises a plurality of functional components including a transceiver component 148, a prepaid exchange component 150, a risk evaluation component 152, and one or more risk database components 154. In general, these components may either be part of a single integrated system or may be comprised of a distributed system. In one aspect, the authorizing host 108 is adapted to route prepaid service requests from the transaction device 104 to the appropriate prepaid exchange host 156. In addition, the authorizing host 108 is further adapted to route approval or declines for prepaid goods and services along with authorization codes from the prepaid exchange host 156 to the transaction device 104. Advantageously, the authorizing host 108 facilitates communication between the one or more transaction devices 104 and the prepaid exchange host 156, wherein prepaid transaction information including prepaid service requests and product offerings is routed therebetween via the authorizing host 108.

As discussed above, the authorizing host 108 is adapted to determine and evaluate the risk for financial transactions involving promissory payments received from the transaction device 104. For example, the risk evaluation component 152 evaluates financial information, such as the check amount, the ID of the check writer, the merchant, and the type of merchandise or products being purchased to determine the risk of accepting the check draft or other proffered promissory payment. Moreover, the risk or level thereof is indicative of whether the proffered promissory payment will be backed by suitable funds in the individual's account when the merchant submits the check draft, either electronically or physically, to the customer's bank. The manner in which this risk assessment is done is substantially the same as existing risk assessment agencies such as TeleCheck™ of Houston, Tex.

Furthermore, the authorizing host 108 is adapted to interact and communicate with the one or more transaction devices 104 via the transceiver components 128, 148, such as a telephonic, satellite, and/or computer network (internet) interface. In addition, the authorizing host 108 is further adapted to interact and communicate with the prepaid exchange hosts 156 in a similar manner. Also, the authorizing host 108 is adapted to perform risk analysis for a plurality of merchants on a plurality of different types of financial transactions. Moreover, the authorizing host 108 further returns an approval or decline decision to the transaction device 104 via the transceiver components 128, 148, and the applicable results can be displayed on the output component 130 of the transaction device 104.

In one embodiment, the transceiver component 148 of the authorizing host 108 is adapted to receive data and information including the transaction data package from each transceiver component 128 of the one or more transaction devices 104. The transceiver component 148 may also be adapted to transmit data and information including approval and/or decline data to the transaction device 104. Also, the transceiver component 148 may, in certain implementations, be adapted to transmit data and information including prepaid transaction information from to the prepaid exchange host 156. The transceiver component 148 may also be adapted to receive data and information including prepaid service offerings from to the prepaid exchange host 156. It should be appreciated that the transceiver component 148 for the authorizing host 108 may have similar scope and functionality as the transceiver component 128 for the transaction device 104.

FIG. 2 illustrates one embodiment of the transaction device 104. As illustrated in FIG. 2, the transaction device 104 may comprise an Eclipse™ terminal 170 currently available from Telecheck, Inc. of Houston, Tex. Advantageously, in one aspect of the present teachings, the Eclipse™ terminal 170 can be adapted so as to integrate the prepaid component 124 therein so that prepaid service requests can be accepted and sent to the authorizing host 108 for each financial transaction. It should be appreciated by those skilled in the art that the remote terminal or POS device may also include various forms of payment devices including a cash register, personal computer, etc. without departing from the scope of the present teachings. Therefore, it should also be appreciated by those skilled in the art that the prepaid component 124 as described herein may be integrated into various types of payment devices without departing from the scope of the present teachings.

In one embodiment, the Eclipse™ terminal 170 comprises a POS payment terminal that is adapted to accept various non-cash payment types including checks, credit cards, debit cards, and electronic benefit transfer (EBT) transactions. In addition, the Eclipse™ terminal 170 also enables the TeleCheck Electronic Check Acceptance® (ECA®) service and many other TeleCheck services. Advantageously, TeleCheck and the Eclipse™ terminal combine the benefits of accurate databases with advanced authorization and payment technology.

In one embodiment, the Eclipse™ terminal 170 comprises a built-in ink jet receipt printer 172 that reduces counter space, voids ECA transactions, and endorses paper checks to include subscriber number and approval code. Additionally, the Eclipse™ terminal 170 comprises a backlit touch-screen display 174 that provides a user friendly interface and exceptional visibility. Moreover, the Eclipse™ terminal 170 rapidly authorizes financial transactions so as to speed up checkout. In one embodiment, the Eclipse™ terminal 170 comprises a check reader 176 that enables the conversion of paper checks to electronic items. In addition, the Eclipse™ terminal 170 comprises a dual-track magnetic strip reader 178 that automatically collects and inputs data from credit cards and driver's licenses.

Furthermore, the Eclipse™ terminal 170 comprises a full reporting capability that provides easy access to transaction and payment information including sales amounts and various other details for each payment type. In one embodiment, the Eclipse™ terminal 170 stores up to 500 check and 300 card transactions. In addition, the Eclipse™ terminal 170 comprises check imaging capability that allows merchants to process most checks without identification. Also, the Eclipse™ terminal 170 comprises a user friendly keyboard 180, such as a numeric or alphanumeric keyboard, and a display 182, such as an LCD display or various other displays generally known in the art. It should be appreciated by those skilled in the art that the transaction device 104 may comprise various other generally known POS devices without departing from the scope of the present teachings.

In one aspect, the Eclipse™ terminal 170 can be adapted to recognize and accept prepaid service or transaction requests. For example, the merchant can request a prepaid transaction and input acquired prepaid information from the customer by a variety of methods including pushing a button on the Eclipse™ terminal 170 that allows data and information to be subsequently inputted into the Eclipse™ terminal 170 via keyboard 180 entry or, similarly, by selecting a displayed menu item on the display 182 of the Eclipse™ terminal 170 that corresponds to prepaid transactions or service requests. The merchant can input via the keyboard 180 some form of customer identity, such as the cell phone number, account number, calling card serial number, etc., so that the Eclipse™ terminal 170 can to link the customer, the merchant, the prepaid exchange host 156, and identification of itself to the prepaid transaction or service request via some form of recognizable data or information packet for transmission to the authorizing host 108.

Advantageously, the data or information packet allows the authorizing host 108 to identify the prepaid transaction or service request for proper processing and routing to the requested prepaid service provider. In addition, the transaction information can be transmitted from the Eclipse™ terminal 170 to the authorizing host 108 via the data packet with a header or signature that identifies the prepaid transaction type including the prepaid service provider, merchant, customer, the Eclipse™ terminal 170, and various other relevant information for processing and routing of the prepaid service request. Moreover, the Eclipse™ terminal 170 can also be adapted to receive responses from the authorizing host 108, such as authorization codes and any other relevant information related to the prepaid transaction.

Figure 3A:
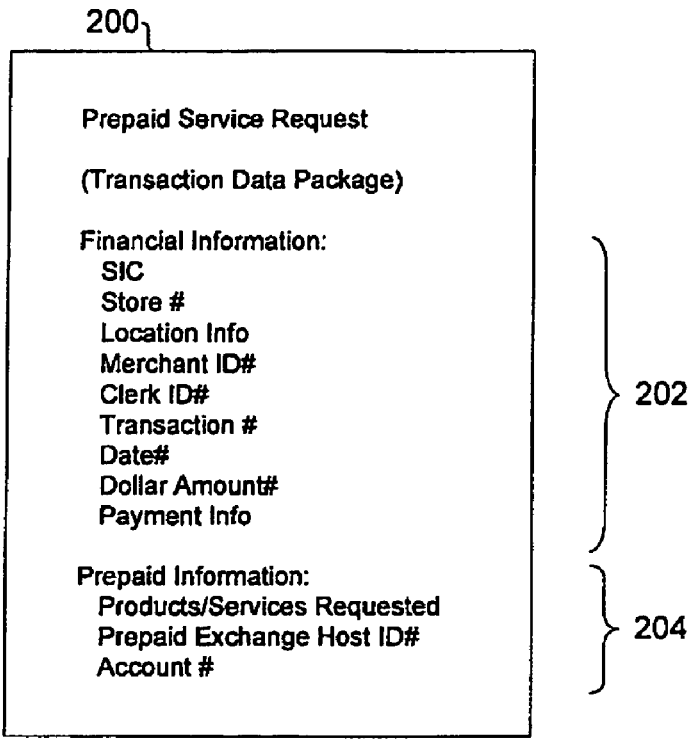
FIG. 3A illustrates one embodiment of a transaction data/information package that can be transmitted from the transaction device to the authorizing host.

FIG. 3A illustrates one embodiment of a transaction data/information package 200 relating to a prepaid transaction/service request that can be transmitted from the transaction device 104 including the Eclipse™ terminal 170 to the authorizing host 108. The transaction data package 200 of FIG. 3A is simply exemplary of the information that is provided to the authorizing host 108 when a prepaid authorization request is being sent to the authorizing host 108 for assessment, and the format of the packet can be any of a number of different formats known in the art. As further illustrated in FIG. 3A, the transaction data package 200 may comprise financial transaction information 202 and prepaid transaction information 204, such as information related to the requested prepaid products/services and prepaid exchange host identification information.

Additionally, in one aspect, the transaction information 202 may include one or more information/data components including store information, merchant information, clerk identification number, customer information, transaction number, transaction date, transaction dollar amount, and payment information, such as credit, check, and/or cash information. The transaction information 202 may further include a subscriber information code (SIC) that identifies the merchant and/or transaction device 104. The exact contents of the transaction information 202 can vary so long as the appropriate information to identify that a request for a prepaid good or service is being sought by a particular point of sale device 104 for a particular amount. In some circumstances, the request may include an account number that is to receive the prepaid service. For example, if the prepaid good or service is cellular telephone minutes for a particular account, the telephone number or some other account number will be provided to the prepaid exchange host 156. The transaction information 202 further includes some identifier of the prepaid exchange host 156 that corresponds to the request for a pre-paid good or service such that the authorizing host 108 can appropriately route the request.

Figure 3B:
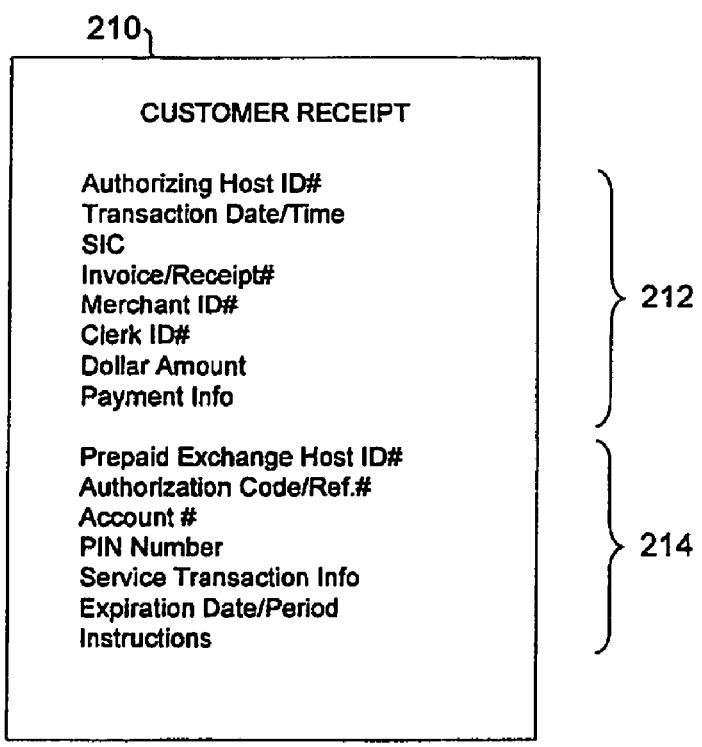
FIG. 3B illustrates one embodiment of a customer receipt that can be delivered to a customer from the transaction device.

FIG. 3B illustrates one embodiment of a customer receipt 210 that can be delivered to a customer from the transaction device 104. The information on the receipt is indicative of information transmitted from the authorizing host 108 to the transaction device 104 after receiving authorization or decline from the pre-paid transaction host 156. The customer receipt 210 of FIG. 3B is simply exemplary of the information that is provided to the transaction device 104 when a financial transaction is approved by the authorizing host 108, and the format of the customer receipt 210 can be any of a number of different formats. In addition, as further illustrated in FIG. 3B, the customer receipt 210 may comprise financial transaction information 212 and prepaid transaction information 214, such as information related to the prepaid exchange host identification, transaction device identification, authorization code/reference number, security code, personal identification (PIN) number, products/services provided, pricing information, expiration date/period, and instructions for activation by the customer.

The receipt 210 can either be a printed receipt or simply an electronic communication provided to the purchaser via the display screen of the remote transaction device 104. It provides an activation code, e.g., a PIN number, and other information necessary for the user to be able to activate the prepaid good or service. In one example, if the prepaid good or service was cellular telephone minutes, the receipt would include an indication of the number of minutes as well as an activation code that the purchaser would enter into their telephone to activate the minutes to thereby inhibit fraud.

Figure 4:
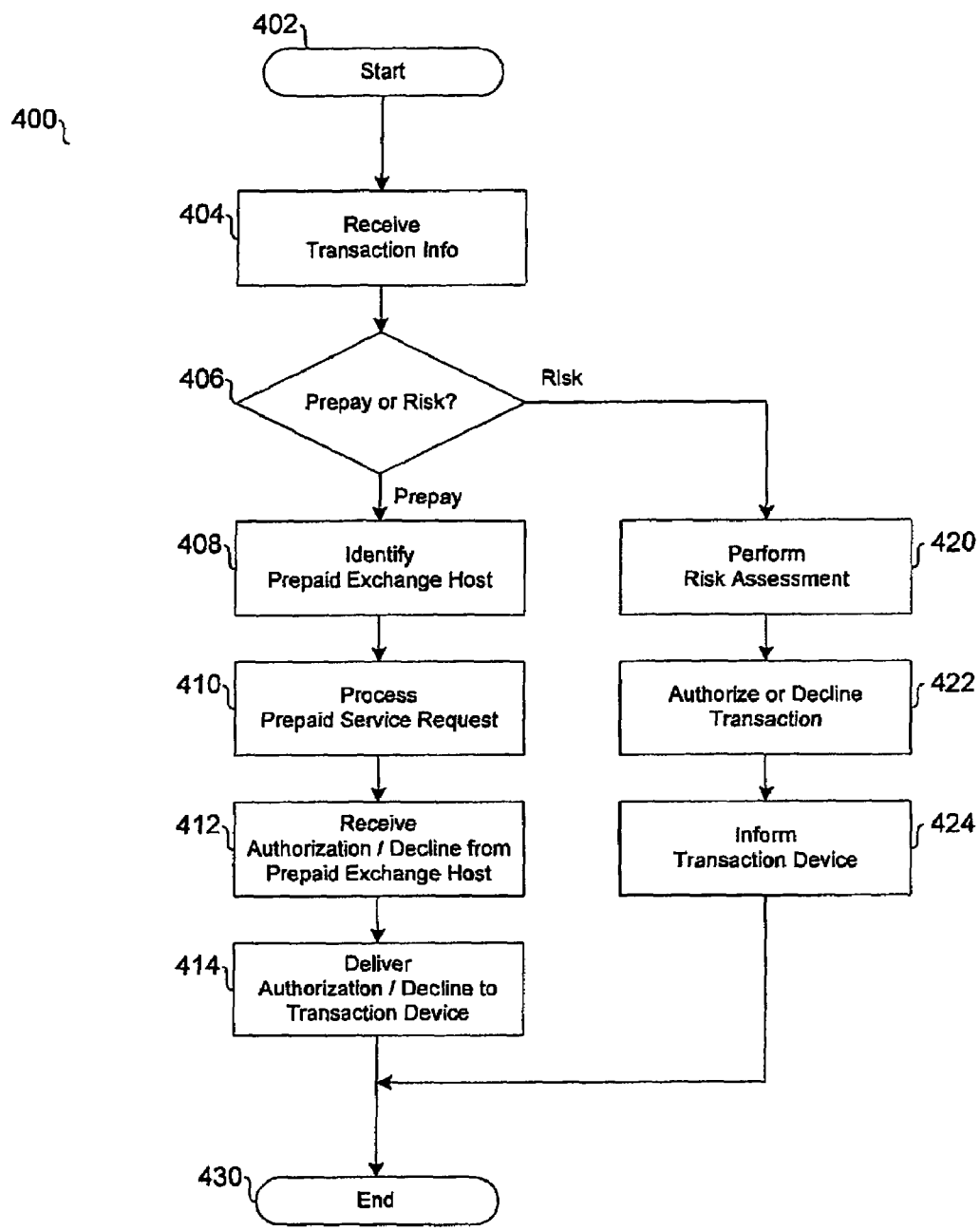
FIG. 4 illustrate one embodiment of a transaction process.

FIG. 4 illustrates one embodiment of a transaction process 400 implemented by the authorizing host 108. As illustrated in FIG. 4, the transaction process 400, from a start state 402, proceeds to state 404, wherein the authorizing host 108 receives the data/information package 200 from at least one of the transaction devices 104. The data/information packet 200 can comprise either a request for prepaid authorization or a request for risk assessment of a financial transaction such as a promissory payment. As discussed above, the data/information packet 200 can include a header that is encoded by the point of sale transaction device 104 identifying the transaction type to the authorizing host 108.

After receiving the packet in state 404, the authorizing host 108, in decision state 406, extracts the transaction information including financial information 202 and prepaid transaction information 204 from the data/information package or prepaid service request 200 and determines whether the transaction is a prepaid service request or risk assessment. If the authorizing host 108 determines that the transaction is a prepaid service request, then the process 400 advances to state 408. In state 408, the authorizing host 108 identifies the prepaid exchange host 156 based, at least in part, on the extracted transaction information from the data package 200.

Once the identity of the prepaid exchange host 156 is determined in state 408, then the authorizing host 108, in state 410, can process the transaction by routing the prepaid service request to the determined prepaid exchange host 156. The prepaid host 156 can then decide whether to authorize or decline the purchase of the prepaid goods or service in substantially the same manner the prepaid host 156 would otherwise make the decision. Subsequently, the prepaid host 156 transmits an approval or decline back to the authorizing host 108 in state 412 for the authorizing host 108 to subsequently transmit in state 414 the authorization or decline to the point of sale transaction device 104. If the prepaid host 156 is approving the transaction, it selects an authorization code, e.g., a PIN number, that is transmitted to the purchaser to activate the prepaid good or service. Alternatively, if the prepaid host 156 is declining the transaction, a decline signal is sent potentially along with an indication of why the transaction was declined.

Alternately, in decision state 406, if the authorizing host 108 determines that the transaction is a risk assessment of a proffered promissory payment, then the authorizing host 108 performs a standard risk assessment of the financial transaction, in state 420. It should be appreciated by those skilled in the art that various risk assessment processes and procedures can be utilized to determine the risk of the financial transaction in state 420. Subsequently, the authorizing host 108 determines, in state 422, whether to approve or decline the financial transaction based, at least in part, on the received transaction information and the performed risk assessment. The authorizing host 108 then provides to the transaction device 104 and the merchant an indication of whether to accept or decline the proffered promissory payment in a manner known in the art.

Hence, in this implementation, a risk assessment network can be used to not only determine the risk of assessing a particular financial transaction, but also to process prepaid transactions. Thus, the requirement of a new network be developed and distributed across multiple store locations is reduced.

More specifically, the one or more transaction devices 104 and the authorizing host 108 are adapted to interact and communicate so as to process financial transactions including prepaid service requests and prepaid financial transactions. In addition, the authorizing host 108 can also manage risk or level thereof associated with financial transactions so as to avoid unacceptable transactions having a moderate to high level of risk. Also, the system 100 including the one or more transaction devices 104 and the authorizing host 108 can be adapted to communicate with a prepaid exchange host 156 so as to process and route financial transactions involving prepaid products and services. Moreover, the prepaid exchange host 156 offers prepaid services for purchase, and prepaid service requests can be routed from the one or more transaction devices 104 to the prepaid exchange host 156 via the authorizing host 108. Similarly, authorization data and information, including security codes and PIN numbers, can be routed from the prepaid exchange host 156 to the one or more transaction devices 104 via the authorizing host 108.

Figure 5A:
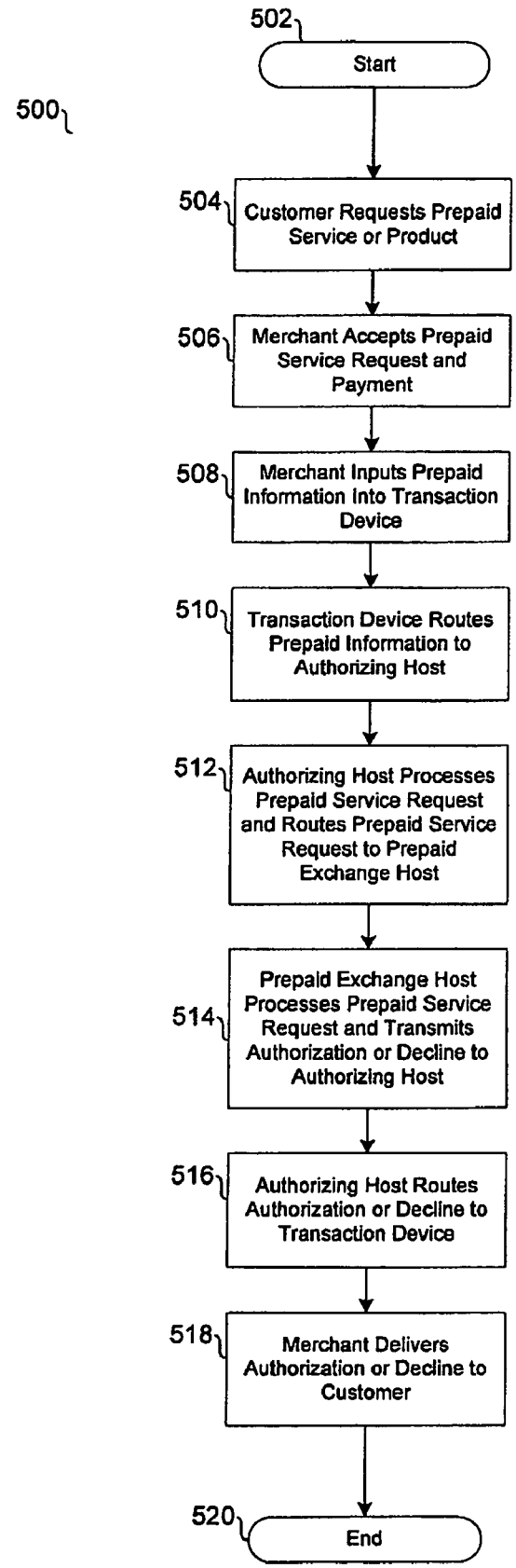
FIG. 5A illustrates one embodiment of a prepaid transaction process.
Figure 5B:
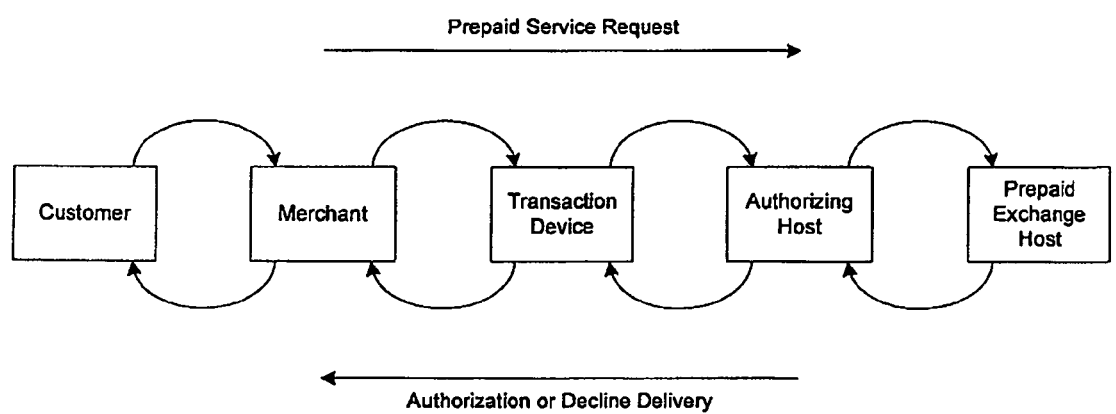
FIG. 5B illustrates one embodiment of a direction of flow for the prepaid transaction process of FIG. 5A.

FIG. 5A illustrates one embodiment of a specific type of prepaid transaction process 500. FIG. 5B illustrates one embodiment of a direction of flow for the prepaid transaction process 500 of FIG. 5A, including a prepaid service request and authorization code delivery, and should be utilized in conjunction with FIG. 5A with the following description. As illustrated in FIG. 5A, the transaction process 500 from a start state 502 and then proceeds to state 504, wherein the customer requests a prepaid product or service, such as, for example, prepaid cellular phone service, purchasing minutes on a calling card, etc. Next, in state 506, the merchant accepts the prepaid service request and payment for the request from the customer. It should be appreciated by those skilled in the art that the payment may comprise cash, check, credit, debit, or any other generally known payment methods. It should also be appreciated by those skilled in the art that state 508 is utilized by the transaction process 500 to input transaction information related to financial and prepaid information 202, 204 of the prepaid service request 200 as described with reference to FIG. 3A.

Following, in state 508, the merchant inputs prepaid transaction information 200, including financial information 202 and prepaid transaction information 204, into the transaction device 104, such as Eclipse™ terminal 170. Next, in state 510, transaction information including financial information 202 or prepaid transaction information 204 are packetized and routed to the authorizing host 108 for assessment and evaluation thereof. In state 512, the authorizing host 108 extracts the transaction information 202, 204 and processes the prepaid service request. Additionally, in state 512, the authorizing host 108 identifies the prepaid exchange host 156 based, at least in part, on the extracted information from the data package 200 and routes the prepaid service request 200 including the prepaid transaction information 204, to the prepaid exchange host 156.

In state 514, after processing the prepaid service request, the prepaid exchange host 156 sends either an authorization, such as a security code or PIN number, or a decline to the authorizing host 108. In one aspect, processing by the prepaid exchange host 156 may include identifying which product or service is requested by the customer, generating an authorization code for the customer, and adding minutes to a prepaid cell phone or calling card. In another aspect, processing by the prepaid exchange host 156 may also include crediting the merchant's account with the amount of purchase of the product or service requested by the customer, wherein the merchant's account can be established prior to processing the transaction. Next, in state 516, after receiving the authorization code or decline from the prepaid exchange host 156, the authorizing host 108 then routes the received authorizing code or information to the transaction device 104 for subsequent delivery to the merchant and then to the customer in state 518. After routing, transmission, and delivery of the authorizing code or information in state 518, the transaction process 500 terminates in end state 520.

Advantageously, the system 100 is adapted to establish a communication link between the one or more transaction devices 104 and the prepaid exchange host 156 via the authorizing host 108 so that financial transactions involving prepaid products and services can be processed and routed between the one or more transaction devices 104 and the prepaid exchange host 156 via the authorizing host 108. In this way, the one or more transaction devices 104 can offer prepaid products and services for purchase, and prepaid service requests can be routed from the one or more transaction devices 104 to the prepaid exchange host 156 via the authorizing host 108. Similarly, prepaid authorization data and information, including security codes and PIN numbers, can be routed from the prepaid exchange host 156 to the one or more transaction devices 104 via the authorizing host 108.

Although the following description exemplifies one embodiment of the present teachings, it should be understood that various omissions, substitutions, and changes in the form of the detail of the apparatus, system, and/or method as illustrated as well as the uses thereof, may be made by those skilled in the art, without departing from the spirit of the present teachings. Consequently, the scope of the present teachings should not be limited to the disclosed embodiments, but should be defined by the appended claims.

What is claimed is:

1. A system for assessing the risk associated with a proffered promissory payment wherein the system is linked to at least one prepaid goods or service provider, the system comprising:
    a plurality of point of sale devices located within a plurality of distributed locations, wherein the plurality of point of sale devices acquire information about proffered promissory payments and also acquire information about requests for prepaid goods or services and wherein the plurality of point of sale devices include a communications interface for communicating information to individuals within the plurality of distributed locations and for communicating information about the proffered promissory payments and the requests for prepaid goods and services; and
    an authorizing host having at least one risk database component that is communicatively linked to the plurality of point of sale devices wherein the authorizing host receives transaction information and determines whether the transaction relates to a proffered promissory payment, in which case the authorizing host assesses the risk of accepting the proffered promissory payment by performing a risk assessment calculation using at least one of the risk database component and communicates acceptance or decline information to the point of sale device corresponding to a particular proffered promissory payment, or whether the transaction relates to a request for a prepaid good or service, in which case the authorizing host is adapted to route the request for a prepaid good or service to a corresponding external goods or services provider without performing risk assessment and then receive acceptance or decline information from the external goods or services provider and transmit acceptance or decline information to the point of sale device originating the request for prepaid good or service.

2. The system of claim 1, wherein the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

3. The system of claim 1, wherein the plurality of transaction devices include an input for inputting information wherein the communications interface comprises a display screen that displays the acceptance and decline information.

4. The system of claim 1, wherein the plurality of transaction devices allow the merchant to transmit requests for prepaid goods or services for a plurality of different prepaid goods and service providers and receive acceptance and decline information from the plurality of different prepaid goods and service providers via the authorizing host.

5. The system of claim 4, wherein the plurality of different prepaid goods and service providers include cellular telephone providers, long distance telephone providers, video rental providers.

6. The system of claim 4, wherein the authorizing host and the plurality of transaction devices are configured to provide an authorizing code to the purchaser of the prepaid goods and services in response to the prepaid good and service provider approving the request for prepaid goods and services.

7. The system of claim 6, wherein the authorizing code comprises a PIN number that the purchaser utilizes to activate the prepaid good or service.

8. A point of sale device adapted to be positioned within a store for transmitting information about proffered promissory payments and about requests for prepaid goods and services to a central authorizing agency having one or more risk database components for subsequent determination as to whether the information relates to a proffered promissory payment, in which case a risk assessment calculation is performed by the central authorizing authority using the risk database components, or whether the information relates to a request for a prepaid good or service, in which case the information is retransmitted to an external prepaid goods or services provider, and wherein the central authorizing agency receives approval or decline information from prepaid goods and services provider which is retransmitted to the point of sale devices wherein the point of sale device is further adapted to provide approval or decline information about the proffered promissory payments and the prepaid goods and service requests to individuals.

9. The device of claim 8, wherein the point of sale device comprises one or more user inputs for inputting information about the proffered promissory payment and the requests for prepaid goods and services into the point of sale device.

10. The device of claim 9, wherein the one or more user inputs includes a scanner for scanning magnetic information off of checks.

11. The device of claim 9, wherein the one or more user inputs includes a keypad for entering data relating to the request for prepaid goods and services.

12. The device of claim 8, wherein the point of sale device includes a display for displaying an authorization code to the purchaser of the pre-paid goods and services.

13. The device of claim 12, wherein the authorization code comprises a PIN number suitable for activating additional minutes on a cellular telephone account.

14. A system for processing requests for prepaid goods and services and for performing risk assessment on preferred promissory payments, the system comprising a risk assessment system having a plurality of distributed transaction devices located at a plurality of different locations and an authorizing host, having at least one risk database component, that receives information about proffered promissory payments from the plurality of distributed transaction devices as well as requests for prepaid goods or services, wherein the authorizing host determines whether received information relates to a proffered promissory payment, in which case the authorizing host performs a risk assessment on the proffered promissory payments by using the at least one risk database component and sends approval or decline signals to the distributed transaction device where the proffered promissory payment originated, or whether received information relates to a request for a prepaid good or service, in which case the authorizing host routes the request to prepaid goods and services vendors that are independent of the risk assessment system and receives approval information from the goods and service vendors via the risk assessment system which are then retransmitted to the originating distributed transaction devices.

15. The system of claim 14, wherein the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

16. The system of claim 14, wherein the plurality of transaction devices include an input for inputting information and wherein the communications interface comprises a display screen that displays the acceptance and decline information.

17. The system of claim 14, wherein the plurality of transaction devices allow the merchant to transmit requests for prepaid goods or services for a plurality of different prepaid goods and service providers and receive acceptance and decline information from the plurality of different prepaid goods and service providers via the authorizing host.

18. The system of claim 17, wherein the plurality of different prepaid goods and service providers include cellular telephone providers, long distance telephone providers, video rental providers.

19. The system of claim 17, wherein the authorizing host and the plurality of transaction devices are configured to provide an authorizing code to the purchaser of the prepaid goods and services in response to the prepaid good and service provider approving the request for prepaid goods and services.

20. The system of claim 19, wherein the authorizing code comprises a PIN number that the purchaser utilizes to activate the prepaid good or service.

21. A method of processing financial transactions, the method comprising:
transmitting data about a proffered promissory payment or about a request for prepaid goods or services offered at a remote location to a central authorization host;
determining whether the data is related to a proffered promissory payment or whether the data is related to a request for prepaid goods or services;
performing risk assessment on a proffered promissory payment by performing a risk assessment calculation using at least one risk database component;
transmitting an acceptance or decline of the proffered promissory payment from the central authorization host to the remote location;
forwarding data about a request for a prepaid good or service from the remote location to an independent prepaid goods or service provider via the central authorization host;
providing authorization information to the remote location from the prepaid good or service provider via the central host.

22. The method of claim 21, wherein transmitting data about a proffered promissory payment offered at a remote location to a central authorization host comprises sending data about a check written to a merchant to the central authorization host.

23. The method of claim 22, wherein performing risk assessment on the proffered promissory payment comprises evaluating the history of the person writing the check, the amount of the check, the type of transaction and characteristics of the merchant to determine whether to accept or decline the check.

24. The method of claim 21, wherein transmitting data about a request for a prepaid good and service from the remote location to a prepaid good and service provider via the central authorization host comprises:
sending an electronic signal comprising the request to the central authorization host identifying a particular good and service provider;
routing the electronic signal comprising the request from the central host to the particular good and service provider.

25. The method of claim 24, wherein providing authorization information to the remote location from the prepaid good and service provider via the central host comprises transmitting a PIN number from the prepaid good and service provider to the remote location via the central authorizing host.

26. A system for processing financial transactions comprising:
means for transmitting information, including proffered promissory payments and requests for prepaid goods and services, to and from a plurality of remote locations;
means for receiving the information and determining whether the information relates to a proffered promissory payment, in which case the proffered promissory payment is evaluated to ascertain the risk of accepting the proffered promissory payments, or a request for a prepaid good or service, wherein means for evaluating the proffered promissory payment including at least one or more risk database components, and wherein the risk of accepting the proffered promissory payment includes performing a risk calculation using the at least one or more risk database components wherein the means for evaluating a proffered promissory payment includes means for retransmitting requests for prepaid goods and services to an external goods and service provider and means for transmitting authorization information from the external goods and service provider to the means for transmitting proffered promissory payments and requests for prepaid services.

27. The system of claim 26, wherein the means for transmitting information including financial data and requests for prepaid good and services comprises a plurality of point of sale devices located within a plurality of distributed locations, wherein the plurality of point of sale devices acquire information about proffered promissory payments and also acquire information about requests for prepaid goods or services and wherein the plurality of point of sale device include a communications interface for communicating information to individuals within the plurality of distributed locations.

28. The system of claim 27, wherein the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

29. The system of claim 27, wherein the plurality of transaction devices include an input for inputting information wherein the communications interface comprises a display screen that displays the acceptance and decline information.

30. The system of claim 27, wherein the plurality of transaction device allows the merchant to transmit requests for prepaid goods or services for a plurality of different prepaid goods and service providers and receive acceptance and decline information from the plurality of different prepaid goods and service providers via the authorizing host.

31. The system of claim 27, wherein the means for evaluating financial data from the means for transmitting information to assess the risk of accepting proffered promissory payment comprises an authorizing host that is communicatively linked to the plurality of point of sale devices wherein the authorizing host receives the information about the proffered promissory payments and assesses the risk of accepting the proffered promissory payment and wherein the authorizing host communicates acceptance or decline information to the point of sale device corresponding to a particular proffered promissory payment and wherein the authorizing host is adapted to route a request for a prepaid good or service to the corresponding goods or services provider and then transmit acceptance or decline information to the point of sale device originating the request for prepaid good or service.

32. The system of claim 31, wherein the authorizing host and the plurality of transaction devices are configured to provide an authorizing code to the purchaser of the prepaid goods and services in response to the prepaid good and service provider approving the request for prepaid goods and services.

33. The system of claim 32, wherein the authorizing code comprises a PIN number that the purchaser utilizes to activate the prepaid good or service.

34. A system for assessing the risk associated with a proffered promissory payment wherein the system is linked to at least one prepaid goods or service provider, the system comprising:
- a plurality of point of sale devices located within a plurality of distributed locations, wherein the plurality of point of sale devices acquire information about a first type of financial transaction and also acquire information about a second type of financial transaction and wherein the plurality of point of sale devices include a communications interface for communicating information to individuals within the plurality of distributed locations; and
- an authorizing host having at least one risk database component that is communicatively linked to the plurality of point of sale devices wherein the authorizing host receives the information and determines whether the information relates to the first type of financial transaction, in which case the authorizing host assesses the risk associated with the first type of financial transaction by performing a risk calculation using the at least one risk database component and communicates acceptance or decline information to the point of sale device corresponding to first type of financial transaction, or whether the information relates to the second type of financial transaction, in which case the authorizing host is adapted to route information about the second type of financial information to a corresponding external provider and then transmit acceptance or decline information to the point of sale device originating the second financial transaction.

35. The system of claim 34, wherein the first type of financial transaction comprises a proffered promissory payment and wherein the second type of financial transaction comprises a request for prepaid goods or services.

36. The system of claim 35, wherein the plurality of transaction devices acquire financial information about a proffered promissory payment that include the amount, the account corresponding to the proffered promissory payment, the account holder and further transmits information about the merchant to the authorizing host such that the authorizing host can perform risk assessment on the proffered promissory payment.

37. The system of claim 35, wherein the plurality of transaction devices include an input for inputting information wherein the communications interface comprises a display screen that displays the acceptance and decline information.

38. The system of claim 35, wherein the plurality of transaction devices allow the merchant to transmit requests for prepaid goods or services for a plurality of different prepaid goods and service providers and receive acceptance and decline information from the plurality of different prepaid goods and service providers via the authorizing host.

39. The system of claim 38, wherein the plurality of different prepaid goods and service providers include cellular telephone providers, long distance telephone providers, video rental providers.

40. The system of claim 38, wherein the authorizing host and the plurality of transaction devices are configured to provide an authorizing code to the purchaser of the prepaid goods and services in response to the prepaid good and service provider approving the request for prepaid goods and services.

41. The system of claim 40, wherein the authorizing code comprises a PIN number that the purchaser utilizes to activate the prepaid good or service.

\* \* \* \* \*